United States Patent [19]

Bederke et al.

[11] 4,268,659

[45] May 19, 1981

[54] MODIFIED POLYESTER IMIDES, HARDENABLE BY ENERGY-RICH RADIATION, PROCESS FOR THEIR PRODUCTION AND THEIR USE FOR THE INSULATION OF ELECTRIC WIRES

[75] Inventors: Klaus Bederke, Sprockhoevel; Hermann Kerber, Wuppertal, both of Fed. Rep. of Germany

[73] Assignee: Herberts Gesellschaft mit beschrankter Haftung, Wuppertal, Fed. Rep. of Germany

[21] Appl. No.: 133,898

[22] Filed: Mar. 25, 1980

[30] Foreign Application Priority Data

Apr. 12, 1979 [DE] Fed. Rep. of Germany ....... 2915011

[51] Int. Cl.³ ...................... C08G 63/44; C08G 69/44
[52] U.S. Cl. ........................... 528/288; 174/110 SR; 204/159.16; 204/159.19; 428/375
[58] Field of Search ............. 525/440, 445, 446, 447; 528/288

[56] References Cited

U.S. PATENT DOCUMENTS

| | | | |
|---|---|---|---|
| 3,455,801 | 7/1969 | D'Alelio et al. | 528/303 X |
| 3,804,736 | 4/1974 | Pasternack | 528/288 X |
| 3,968,015 | 7/1976 | Nyberg | 525/445 X |
| 4,001,097 | 1/1977 | Ogasawara et al. | 204/159.16 |
| 4,112,017 | 9/1978 | Howard | 525/440 |
| 4,206,025 | 6/1980 | Vrancken et al. | 204/159.16 |

*Primary Examiner*—Lucille M. Phynes
*Attorney, Agent, or Firm*—Schwartz, Jeffery, Schwaab, Mack, Blumenthal & Koch

[57] ABSTRACT

Modified polyester imides, hardenable by energy-rich radiation and containing an acrylic or methacrylic ester group having a hydroxyl group, said ester group being linked to the polyester imide molecule by way of an oxygen atom that is located on the carbon atom adjacent to the carbon atom carrying said hydroxyl group, as well as a process for their production and their use for the insulation of electric wires.

9 Claims, No Drawings

MODIFIED POLYESTER IMIDES, HARDENABLE BY ENERGY-RICH RADIATION, PROCESS FOR THEIR PRODUCTION AND THEIR USE FOR THE INSULATION OF ELECTRIC WIRES

The invention relates to modified polyester imides, hardenable by energy-rich radiation, a process for their production and their use for the insulation of electric wires.

Modified polyester imides and their use for the insulation of electric wires (magnetic wires) are known in large numbers. As a rule, insulation is effected by coating the electric wires with a solution or melt of the polyester imides and then, following the coating operation, hardening the polyester imides on the wire under the influence of elevated temperature. There is a need of modified polyester imides for this application purpose, which can be hardened by energy-rich radiation. It is known that hardening of polymer compounds with crosslinking under the influence of energy-rich radiation is feasible if the polymer compounds that are to be hardened possess radically polymerisable double bonds. Hitherto, however, success has not been achieved in producing modified polyester imides, hardenable by energy-rich radiation, which could be satisfactorily employed in practice for the insulation of electric wires. The present invention is based on the problem of producing modified polyester imides of this kind and of using them for the insulation of electric wires.

Accordingly, a subject of the present invention is modified polyester imides, hardenable by energy-rich radiation, obtained by reaction of diamines containing two primary amino-groups with polycarboxylic acids containing carboxyl groups in the 1- and 2- positions and at least one further carboxyl group, and optionally in addition with other polyvalent carboxylic acids, or anhydrides or esters of such acids, followed by esterification and, optionally, reaction with polyisocyanates and/or alkoxypolysiloxanes, characterised in that they contain, through incorporation by condensation, an acrylic or methacrylic ester group which contains a hydroxyl group and is linked to the polyester imide molecule by way of an oxygen atom that is located on the carbon atom adjacent to the carbon atom carrying said hydroxyl group.

A further subject of the invention is a process for the production of modified polyester imides, hardenable by energy-rich radiation, by reaction of diamines containing two primary amino-groups, with polycarboxylic acids containing carboxyl groups in the 1- and 2-positions and at least one further carboxyl group, and optionally in addition with other polyvalent carboxylic acids, or anhydrides or esters of such acids, followed by esterification and, optionally, reaction with polyisocyanates and/or alkoxypolysiloxanes, characterised in that, after the reaction of said diamines with said polycarboxylic acids, esterification is effected with acrylic or methacrylic esters containing an oxirane ring.

The diamines used according to the invention can be those compounds normally employed in the art for the production of polyester imides. Examples of these are aliphatic, aromatic or cyclo-aliphatic diamines. Examples of aliphatic diamines are ethylene diamine, hexamethylene diamine, trimethylhexamethylene diamine. Examples of aromatic diamines are diaminodiphenylmethane, phenylene diamine, toluylene diamine, xylylene diamines. Examples of diamines containing cycloaliphatic rings are 4,4'-dicyclohexane diamine, bis-aminomethylnorbornane, isophorone diamine and 4,4'-diaminodicyclohexylmethane. Commercial products, containing mixtures of diamines, can also be employed. Examples of these are the products of BASF, sold under the trade mark 'Laromin'.

The polycarboxylic acids used can be aromatic or aliphatic carboxylic acids. Aromatic carboxylic acids are preferred, as is customary in the art for the production of polyester imides, particularly trimellitic acid, hemimellitic acid, pyromellitic acid and mellitic acid or their anhydrides. Particularly for reasons of easy availability and price, trimellitic acid or its anhydride are preferred.

The aliphatic carboxylic acids employed can be, for example, 1,2,3,4-butane tetracarboxylic acid or tricarboxylic acids, obtained by reaction of conjugated aliphatic monocarboxylic acids or their glycerol esters, such as wood oil, dehydrated castor oil, oiticica oils and other oils having conjugated double bonds, and $\alpha,\beta$-unsaturated dicarboxylic acids, such as maleic acid or its anhydride, by way of a Diels-Alder reaction.

Optionally, other polyvalent carboxylic acids or their anhydrides or lower alkyl esters, (preferably having from 1 to 4 carbon atoms), especially methyl esters, can be employed in addition, as this is customary according to the state of the art for the production of polyester imides. Examples of these are, particularly, phthalic acid, isophthalic acid, terephthalic acid, tetrahydrophthalic acid and endomethylenetetrahydrophthalic acid or the corresponding partially or fully halogenated compounds (with flame-retardant properties) or their anhydrides or esters. It is however also possible to employ, at least partially, yet other similar dicarboxylic acids or their anhydrides or esters.

According to the prior art esterification may be effected by means of polyhydric alcohols, particularly ethylene glycol, 1,2-propane-diol and 1,3 propane-diol, butane-diols, particularly 1,4-butane-diol, hexane-diols, particularly 1,6-hexane-diol, 1,3-trimethylhexane-diol or 1,6-trimethylhexane-diol, neopentyl glycol, pentane diols, hydroxypivalic acid/neopentyl glycol ester, pivalyl pivalate, 3(4),8(9)-dihydroxymethyl-tricyclo(5,2,1,0$^{2.6}$) decane, ether glycols, particularly triethylene glycol; glycerol, tris-hydroxyethyl-isocyanurate, trimethylolpropane or trimethylolethane, pentaerythritol and dipentaerythritol. According to the invention, these hydroxy compounds can also be partially employed for esterification. If compounds of this type are employed however, it is necessary for them to have been reacted with the remaining reaction components before esterification is effected, according to the invention, with acrylic or methacrylic esters containing an oxirane ring.

The essential feature of the invention consists in carrying out the esterification, after the reaction of the amines with the carboxylic acids, with acrylic or methacrylic esters containing an oxirane ring. The modified polyester imides thus obtained contain in their molecule at least one group of the acrylic or methacrylic esters defined above. These groups supply the radically polymerisable double bonds, which make hardening by means of energy-rich radiation possible. Surprisingly, incorporation of these special groups yields polyester imides that can be applied extremely well to the electric wire, yield even levelling and harden, under the influence of energy-rich radiation, to form coatings, the properties of which fulfil the requirements for coated wires. In particular, the hardened coatings possess good elasticity and, at the same time, great hardness (scratch resistance). A further feature is that the coatings adhere particularly well to the electric wire. Possibly, these properties can be ascribed, inter alia, to the hydroxyl group, present on the carbon atom which is adjacent to that carbon atom, to which the oxygen atom is linked, by way of which the acrylic or methacrylic esters are linked to the remaining polyester imide molecule.

The reaction according to the invention with an acrylic or methacrylic ester containing an oxirane ring, has the extraordinary advantage, from the point of view of chemical engineering, that it can be carried out at very low temperatures, e.g. of from about 90° to 150° C., preferably from 100° to 130° C.

Glycidyl acrylate or glycidyl methacrylate are particularly preferred as acrylic or methacrylic esters containing an oxirane ring, as they are easily available. The polyester imides according to the invention thus obtained are characterised in that they contain the group of the formula

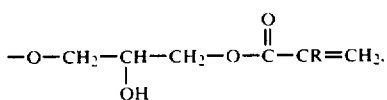

where R denotes hydrogen or the methyl group.

Other acrylic or methacrylic esters which contain an oxirane ring and can be used are the reaction products of acrylic acid or methacrylic acid with diepoxide compounds or diepoxide resins, in molecular proportion.

Examples of this type of diepoxide compounds are 1,4-butane-diol diglycidyl ether, ethylene glycol diglycidyl ether, N,N-diglycidylaniline, N,N-diglycidylcyclohexylamine, hexahydrophthalic acid diglycidyl ester, Δ⁴-tetrahydrophthalic acid diglycidyl ester, phthalic acid diglycidyl ester, 3,6-endomethylene-Δ⁴-tetrahydrophthalic acid diglycidyl ester, 1-epoxyethyl-3,4-epoxycyclohexane, 3,4-epoxycyclohexylmethyl-3,4-epoxycyclohexane carboxylate, bis-(3,4-epoxy-6-methylcyclohexylmethyl) adipate, bisphenol-A-diglycidyl ether. Some formulae of compounds of this type are given by way of example as follows: reaction product of 1-epoxyethyl-3,4-epoxycyclohexane with (meth)acrylic acid:

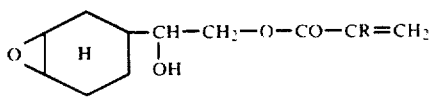

and

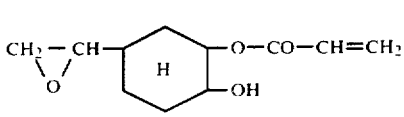

reaction product of 3,4-epoxycyclohexanemethyl-3,4-epoxycyclohexane carboxylate with (meth)acrylic acid

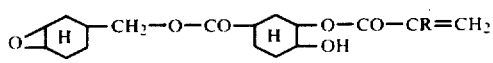

and

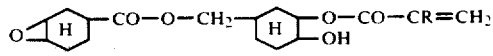

reaction product of bis-(3,4-epoxy-6-methylcyclohexylmethyl) adipate with (meth)acrylic acid:

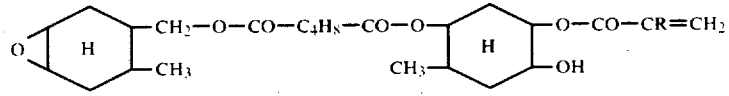

and

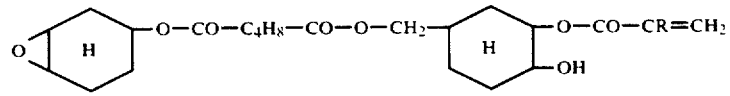

Preferably, approximately from 0.8 to 1 equivalent of the diamines and from 0.8 to 1.5 molecules of the acrylic or methacrylic esters containing an oxirane ring, are used for 1 molecule of the polycarboxylic acids in the production of the polyester imides according to the invention.

The quantitative ratio of the starting products is selected so that at least one acryloyl or methacryloyl group is present per 3000 molecular weight. Preferably, therefore, at least one group of the above formula I is contained per 3000 molecular weight in the modified polyester imides according to the invention. Preferably, not more than 6 groups of the formula I are contained per 3000 molecular weight. The lower limit for the number of these groups is given by the fact that adequate hardening by energy-rich radiation is made possible, since these groups are responsible for the hardening action. The upper limit for the number of these groups is determined by the fact that embrittlement of the hardened resins occurs at an excessive number. For this reason, it is particularly preferred that one group of the above formula I is present per from 1500 to 2500 molecular weight.

A hydroxyl-group is formed by the reaction of the acrylic or methacrylic esters containing an oxirane ring, with the other starting compounds. This hydroxyl-group can be reacted with other compounds that react with hydroxyl-groups. These include, for example, polyisocyanates and/or alkoxypolysiloxanes, as they can also be employed for the modification of the known polyester imides. Diisocyanates and triisocyanates are particularly preferred, such as hexamethylene diisocyanate, toluylene diisocyanate, isophorone diisocyanate, reaction products of one molecule of water and three molecules of hexamethylene diisocyanate (Desmodur N of Bayer AG); furthermore, reaction products, containing isocyanate-groups, of polyhydric alcohols with polyisocyanates, for example, the reaction product of one molecule of trimethylolpropane with three molecules of toluylene diisocyanate. Moreover, dimerised or polymerised isocyanates are suitable.

Examples of alkoxypolysiloxanes are acyclic or cyclic alkylphenylsiloxanes, containing from difunctional to pentafunctional alkoxy-groups, preferably having a molecular weight of from 500 to 2000, approximately. Compounds of this type are sold, for example, by Dow Corning, USA, under the grade notation Silicone-Intermediate Z-6188 or Q1-3037, and by Wacker Chemie, Federal Republic of Germany, under the grade notation SY 231.

The hydroxyl-groups mentioned, however, can also be esterified with other carboxylic acids. As a rule, however, this is rather difficult, as these are secondary hydroxyl-groups, possessing reduced reactivity.

In the simplest case of the process according to the invention, the additional carboxyl-group of the polycarboxylic acids reacts with the oxirane-ring of the acrylic or methacrylic esters. However, it is also possible for further ester-forming starting components to be employed, so that the additional carboxyl-group of the polycarboxylic acid first reacts with other hydroxy-functional compounds and the acrylic or methacrylic esters containing an oxirane-ring, then are linked to the respective chain-end. The connecting links, used in this sense, between the polycarboxylic acid on the one hand, and the acrylic or methacrylic esters containing an oxirane-ring, on the other, can also be the above-mentioned polyisocyanates and/or alkoxypolysiloxanes.

For the production of the polyester imides according to the invention, oils can be additionally used, which particularly impart good elasticity to the polyester imides.

Suitable oils are conjugated oils, which have been reacted with α,β-unsaturated carboxylic acids or their anhydrides, preferably maleic anhydride. These reaction products react with the amino-groups of the amines, with formation of five-membered imide-rings and are incorporated into the polyester imide in this way (cf. West German Unexamined Patent Application (Offenlegungsschrift) No. 28 56 050).

In principle, the process for the production of the modified polyester imides according to the invention is effected as the production of the known polyester imides, i.e. the starting components are reacted in the presence or absence of an entraining agent, (e.g. xylene), by heating to temperatures within the range of from about 140° to about 220° C. The upper limit is determined by avoiding decomposition reactions, the lower limit by adequate reaction in a suitable time. Optionally, customary esterification catalysts and/or other additives and auxiliary substances can be used. Examples of esterification catalysts are titanates, such as butyl titanate, acetates, such as zinc acetate, antimony oxide, ortho-phosphoric acid, phosphorous acid, triphenyl phosphite and triphenyl phosphine.

Production is carried out according to the invention so that, first, the amines are reacted with the polyvalent carboxylic acids, with formation of imides. The free carboxyl-groups are appropriately reacted with the acrylic or methacrylic esters containing an oxirane-ring, at temperatures within the range of from 100° to 130° C., approximately. The remaining above-mentioned starting products can then be reacted with the reaction products thus obtained or before the reaction with the acrylic or methacrylic esters containing an oxirane-ring.

If an entraining agent is used, this is suitably distilled off after the completion of the reaction. The resin obtained can be stored.

For use in the insulation of electric wires, the modified polyester imides thus produced are applied in undiluted form or, preferably, mixed with copolymerisable monomeric compounds, to the electric wire in customary wire-coating machines. Suitable viscosities lie between 500 and 20 000 m Pa s/25° C.

Examples of copolymerisable monomeric compounds are methyl methacrylate, butyl acrylate, butyl methacrylate, iso-butyl acrylate, iso-butyl methacrylate, tert.-butyl acrylate, 2-ethylhexyl acrylate, 2-ethylhexyl methacrylate, lauryl acrylate, dihydrodicyclopentadienyl acrylate, ethyl diglycol acrylate, hydroxyethyl acrylate, hydroxyethyl methacrylate, hydroxypropyl acrylate, hydroxypropyl methacrylate, butane-diol monoacrylate, ethane-diol diacrylate, butane-diol diacrylate, triethylene glycol diacrylate, tetraethylene glycol diacrylate, polyethylene glycol diacrylate, hexane-diol diacrylate, neopentyl glycol diacrylate, 3-methylpentane-diol diacrylate, trimethylolpropane triacrylate, pentaerythritol triacrylate, pentaerythritol tetraacrylate, vinyl acetate, vinyl propionate, vinyl acrylate, vinyl carbazole, N-vinyl pyrrolidone, 1-vinyl imidazole, trivinylcyclohexane, triallyl isocyanurate, styrene, vinyl toluene, divinyl benzene, acrylamide and acrylonitrile.

Application to the electric wire is effected at temperatures of from 10° to 80° C., approximately, preferably at room temperature. Hardening by the influence of energy-rich radiation is effected by the use of energy sources, known per se for this purpose. Examples are mercury vapour high pressure radiators, suitably having a power of from 30 to 100 watt $cm^{-1}$, approximately and other sources of radiation, having a proportion of UV-radiation, actinic radiation, electron radiation, suitably having a power of from 100 to 350 KV, approximately.

If UV-radiation is used for hardening, the mixtures applied contain customary photo-initiators. Examples of the latter are benzoin alkyl ether, such as benzoin ethyl ether, benzoin isopropyl ether and benzoin n-butyl ether; acetophenone derivatives, such as diethoxyacetophenone, p-tert.-butyl trichloracetophenone, 4-phenoxytrichloracetophenone; acyloxime esters, such as 1-phenyl-1,2-propane-dione-2-(o-ethoxycarbonyl)oxime; ketals, such as benzildimethylketal; thioxanthones, such as 2-chlorothioxanthone, 2-methylthioxanthone, 4-isopropylthioxanthone, 2-phenylthioxanthone, 2-benzylthioxanthone, 2-acetylthioxanthone; ketone/amine combination; aromatic ketones, such as benzophenone, benzil, anthraquinone; tert. amines, such as triethylamine, dimethyl ethanolamine, ethyl-4-dimethylaminobenzoate; Michler's ketone; dibenzosuberone, 6,11-dihydrodibenzothiepin-11-one(9,10), fluorenone, 1-(4-isopropylphenyl)-2-hydroxy-2-methylpropan-1-one, 2-hydroxy-2-methyl-1-phenyl-propan-1-one.

Customary inhibitors are, for example, hydroquinone, hydroquinone monomethyl ether, p-tert.-butyl pyrocatechol, tolu-hydroquinone and phenothiazine.

EXAMPLE 1

199 g (1.292 molecules) of bis-aminomethyl norbornane and 130 g of xylene are placed in a 2-liter three-necked flask, equipped with stirrer, thermometer, wiper and condenser, and heated to 90° C. After addition of 197 g (1.296 molecules) of tetrahydrophthalic anhydride, the temperature rises to about 132° C. Subsequently, the mixture is heated to 150° C. and condensed at this temperature, with circulation of xylene and 23 g of water dissociation, to an acid number of less than 3. Subsequently, 273 g (1.422 molecules) of trimellitic anhydride are added. The mixture is heated to 150° C., condensed, with 23 g of water dissociation, to an acid number of 153 and the xylol subsequently distilled off in vacuo.

After stabilisation with 1.5 g of hydroquinone, 105 g of hydroxypropyl acrylate are added and the mixture is cooled to 120° C. Subsequently, 242 g (1.704 molecules) of glycidyl methacrylate are metered in with the aid of a dropping funnel within 30 minutes. The temperature is then kept at 120° C. for about 2 hours, until the acid number is 11.7.

EXAMPLE 2

According to the method, as described in Example 1, 310 g (1.292 molecules) of a liquid cycloaliphatic diamine, having a H-active equivalent weight of 60, (commercial product Laromin C 260 of BASF AG), and 130 g of xylene are reacted with 197 g (1.296 molecules) of tetrahydrophthalic, anhydride and condensed to an acid number of less than 3. Subsequently, the reaction is effected with 273 g (1.422 molecules) of trimellitic anhydride, with removal of the entraining liquid, xylene, in vacuo, stabilisation with 1.5 g of hydroquinone and dilution with 128 g of hydroxypropyl acrylate.

242 g (1.709 molecules) of glycidyl methacrylate are then added dropwise at 120° C. within 30 minutes and the mixture is kept at that temperature for 1.5 hours until the acid number is 15.9.

EXAMPLE 3

190 g (0.216 molecule) of crude wood oil and 53 g (0.541 molecule) of maleic anhydride are filled into a 2-liter three-necked flask, equipped with stirrer, thermometer, wiper and condenser, and heated, with stirring, to 60° C. As a result of an exothermic reaction, the temperature rises to 116° C. The mixture is then heated to 120° C. and kept at that temperature for 3 hours.

Subsequently, 75 g of xylene, 18 g (0.118 molecule) of tetrahydrophthalic anhydride and 32 g (0.167 molecule) of trimellitic anhydride are added and heated to 130° C. After addition of 53 g (0.344 molecule) of bis-aminomethyl norbornane, the exothermic reaction is allowed to develop and the mixture is then heated to 160° C. The reaction is conducted at that temperature, with circulation of xylene, until 12 ml of water have separated. The xylene is then distilled off in vacuo. The acid number is 74.7.

1 g of hydroquinone is added at 140° C. and 82 g of hydroxypropyl acrylate are added at 130° C. Subsequently, 31 g (0.218 molecule) of glycidyl methacrylate are metered in with the aid of a dropping funnel within 10 minutes. The reaction is then allowed to continue at 120° C. for 90 minutes and the mixture is diluted with a further 198 g of hydroxypropyl acrylate.

Index numbers: acid number=27.5 mg KOH/g viscosity=4830 mPa.s/25° C.

EXAMPLE 4

3.5% by weight of benzil dimethyl ketal are dissolved at 60° C. in the solution obtained in accordance with Example 3.

A round copper wire, diameter 2 mm, is passed through an annealing unit for removing the entraining agents and recrystallising the copper. Subsequently, the copper wire is coated with the solution in a customary wirecoating unit. The wire is vertically conveyed and the coated wire is hardened by laterally installed mercury vapour high pressure radiators, having a power of 80 Watt per cm each,—2 radiators on each side—at an exhaust speed of 2 m/min. The single layer thickness is from 15 to 20 μm, the total layer thickness, after 4 passages, from 60 to 80 μm.

The varnish films show concentric distribution on the round copper wire, possess outstanding surface smoothness and absence of porosity, high surface hardness and excellent elasticity on the copper wire.

EXAMPLE 5

An UV-hardenable mixture is prepared from 80 parts of the solution of Example 3 and 20 parts of solution of Example 1 by addition of 3.5 parts of benzil dimethyl ketal. Coating and hardening is effected as described in Example 4.

We claim:

1. Modified polyester imides, hardenable by energy-rich radiation and containing an acrylic or methacrylic ester group having a hydroxyl group, said ester group being linked to the polyester imide molecule by way of an oxygen atom that is located on the carbon atom adjacent to the carbon atom carrying said hydroxyl group.

2. Modified polyester imides, according to claim 1, obtained by reaction of diamines containing two primary amino-groups with polycarboxylic acids containing carboxyl groups in the 1- and 2-positions and at least one further carboxyl group, and optionally in addition with other polyvalent carboxylic acids, or anhydrides or esters of such acids, followed by esterification and, optionally, reaction with polyisocyanates and/or alkoxy polysiloxanes, characterised in that they contain, through incorporation by condensation, an acrylic or methacrylic ester group which contains a hydroxyl group and is linked to the polyester imide molecule by way of an oxygen atom that is located on the carbon atom adjacent to the carbon atom carrying said hydroxyl group.

3. Modified polyester imides according to claim 1 or 2, characterised in that they contain as acrylic or methacrylic ester the group of the formula

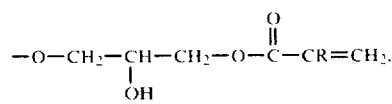

where R denotes hydrogen or the methyl group.

4. Modified polyester imides according to claim 3, characterised in that they contain at least one group of the formula I per 3000 molecular weight.

5. Process for the production of modified polyester imides, hardenable by energy-rich radiation, by reaction of diamines containing two primary amino groups, with polycarboxylic acids containing carboxyl groups in the 1- and 2-positions and at least one further carboxy group and optionally in addition with other polyvalent carboxylic acids, or anhydrides or esters of such acids, followed by esterification and, optionally, reaction with polyisocyanates and/or alkoxypolysiloxanes, characterised in that, after the reaction of said diamines with the said polycarboxylic acids, esterification is effected with acrylic or methacrylic esters containing an oxirane ring.

6. Process according to claim 5, characterised in that esterification is effected with glycidyl acrylate or glycidyl methacrylate.

7. Process according to claims 5 or 6, characterised in that approximately from 0.8 to 1 equivalent of said diamines and from 0.8 to 1.5 molecules of the acrylic or methacrylic esters containing an oxirane ring, are used for 1 molecule of the said polycarboxylic acids.

8. Process according to any one of claims 5 to 7, characterised in that the starting compounds are employed in such quantities that at least one acryloyl or methacryloyl group is present in the polyester imide per 3000 molecular weight.

9. Use of the modified polyester imides according to any one of claims 1 to 8 for the insulation of electric wires by coating the wires and hardening by means of energy-rich radiation.

* * * * *